United States Patent [19]

Reedy, Jr. et al.

[11] Patent Number: 4,828,663
[45] Date of Patent: May 9, 1989

[54] INFUSIBLE PRECERAMIC SILAZANE POLYMERS VIA HIGH ENERGY RADIATION

[75] Inventors: Philip E. Reedy, Jr., Davis, Calif.; John P. Cannady, Madison, Ind.

[73] Assignee: Dow Corning Corporation, Midland, Mich.

[21] Appl. No.: 3,530

[22] Filed: Jan. 15, 1987

[51] Int. Cl.$^4$ ............... C04B 35/59; C08L 83/16; C08G 77/54
[52] U.S. Cl. ............... 204/157.64; 204/157.44; 522/141; 522/144; 522/148; 525/474; 528/25; 528/32; 501/97
[58] Field of Search .............. 522/99, 148, 141, 144; 528/21, 24, 28, 32, 25; 204/157.44, 157.64; 525/474

[56] References Cited

U.S. PATENT DOCUMENTS

| | | | |
|---|---|---|---|
| 4,220,600 | 9/1980 | Yajima | 556/434 |
| 4,546,163 | 10/1985 | Haluska | 528/29 |
| 4,631,260 | 12/1986 | Bartos | 501/87 |
| 4,656,300 | 4/1987 | Lebrun | 528/28 |
| 4,689,252 | 8/1987 | Lebrun | 524/408 |
| 4,694,060 | 9/1987 | Porte | 525/474 |
| 4,722,988 | 2/1988 | Porte | 528/24 |

*Primary Examiner*—John C. Bleutge
*Assistant Examiner*—David Buttner
*Attorney, Agent, or Firm*—James E. Bittell

[57] ABSTRACT

A method is disclosed for the preparation of ceramic materials or articles by the pyrolysis of vinyl- or allyl-containing preceramic silazane polymers wherein the vinyl- or allyl-containing preceramic silazane polymers are rendered infusible prior to pyrolysis by high energy radiation such as gamma rays or an electron beam. Preceramic polymer compositions containing a vinyl- or allyl-containing silazane polymers and mercapto compounds containing at least two mercapto groups may also be rendered infusible by such high energy radiation. This method is especially suited for the preparation of ceramic fibers.

44 Claims, No Drawings

INFUSIBLE PRECERAMIC SILAZANE POLYMERS VIA HIGH ENERGY RADIATION

BACKGROUND OF INVENTION

This invention relates to the preparation of ceramic materials or articles by the pyrolysis of vinyl- or allyl-containing preceramic silazane polymers wherein the vinyl- or allyl-containing preceramic silazane polymers are rendered infusible prior to pyrolysis by high energy radiation such as gamma rays or an electron beam. This method is especially suited for the preparation of ceramic fibers.

This invention also relates to a method of rendering preceramic silazane polymers infusible.

Ceramic materials have been prepared by the pyrolysis of various preceramic polymers in the prior art. Gaul in U.S. Pat. No. 4,312,970 (issued Jan. 26, 1982) obtained ceramic materials by the pyrolysis of preceramic silazane polymers prepared by reacting organochlorosilanes and disilazanes. The preceramic silazane polymers were pyrolyzed in an inert atmosphere without any separate treatment to render the silazane preceramic polymer infusible.

Gaul in U.S. Pat. No. 4,340,619 (issued July 20, 1982) obtained ceramic materials by the pyrolysis of preceramic silazane polymers prepared by reacting chlorine-containing disilanes and disilazanes. Fibers prepared from such preceramic silazane polymers were given a "mild heat treatment" in air before pyrolysis but there is no teaching that such a treatment rendered the fibers infusible.

Cannady in U.S. Pat. No. 4,540,803 (issued Sept. 10, 1985) obtained ceramic materials by the pyrolysis of preceramic silazane polymers prepared by reacting trichlorosilane and disilazane. The preceramic silazane polymers were not rendered infusible prior to pyrolysis to form ceramic materials.

Haluska in U.S. Pat. No. 4,546,163 (issued Oct. 8, 1985) prepared vinyl-containing polysilanes of the average formula $(R_2Si)(RSi)(R'_d(CH_2=CH)Si)$ where R was an alkyl radical containing 1 to 4 carbon atoms, R' was an alkyl radical containing 1 to 4 carbon atoms, a vinyl radical or a phenyl radical, d was 1 or 2 and where the polysilane contained 0 to 60 mole percent $(R_2Si)$ units, 30 to 99.5 mole percent $(RSi)$ units, and 0.5 to 15 mole percent $(R'_d(CH_2=CH)Si)$ units. Shaped articles prepared from such polysilanes could be rendered infusible prior to pyrolysis by UV treatment.

Bartos et al. in U.S. patent application Ser. No. 748,109, filed June 24, 1985, obtained infusible preceramic silazane polymers by treatment of the preceramic silazane polymer with a steam or a steam and oxygen mixture.

Lipowitz, in a copending U.S. patent application entitled "Infusible Preceramic Polymers via Plasma Treatment", obtained infusible preceramic polymer by treatment of the preceramic polymer with a plasma energy source. Both vinylcontaining and vinyl-free preceramic polymers were rendered infusible by plasma treatment. High eenrgy electrons interact with neutral gas molecules in the plasma thereby forming unique species such as metastable species, atoms, radicals, and ions. These unique species then interact with the preceramic polymer thereby rendering the preceramic polymer infusible.

Lutz et al., in a copending application entitled "Infusible Preceramic Polymers via Ultraviolet Irradiation", obtained infusible preceramic polymer compositions by treatment of the compositions with UV irradiation wherein the compositions contained vinyl- or allyl-containing preceramic polymers, mercapto compounds, and photoinitiators.

Yajima et al. in U.S. Pat. Nos. 4,220,600 (issued Sept. 2, 1980), 4,283,376 (issued Aug. 11, 1981), 4,342,712 (issued Aug. 3, 1982), and 4,399,232 (issued Aug. 16, 1983) disclosed the use of gamma ray or electron beam irradiation to cure preceramic modified polycarbosilane fibers prior to pyrolysis. Unmodified polycarbosilane is a polymer having a skeletal structure composed substantially of recurring carbosilane units of the formula

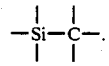

The modified polycarbosilane of U.S. Pat. Nos. 4,220,600 and 4,283,376 are composed mainly of the structural units

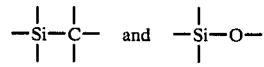

and also contain some boron in the skeletal polymer chain. The modified polycarbosilanes of U.S. Pat. Nos. 4,342,712 and 4,399,232 are block copolymers composed mainly of carbosilane units with titanoxane units of the formula $-(-Ti-O-)-$.

What has been newly discovered is a method of rendering certain preceramic silazane polymers infusible prior to pyrolysis by irradiation of the preceramic silazane polymers with high energy radiation sources such as gamma or electron beam irradiation. This method represents a significant advance in the art of preparing ceramic materials or articles, especially in the art of preparing ceramic fibers.

THE INVENTION

This invention relates to a method of preparing a shaped ceramic material, said method comprising pyrolyzing a shaped infusible preceramic silazane polymer in an inert atmosphere or in a vacuum to a temperature of at least 750° C. until said shaped infusible silazane polymer is converted to a ceramic material, the improvement comprising obtaining the shaped infusible preceramic silazane polymer by a method of rendering a vinyl- or allyl-containing preceramic silazane polymer infusible prior to the pyrolysis by a method which comprises treating a vinyl- or allyl-containing preceramic silazane polymer with high energy radiation for a time sufficient to render the vinyl- or allyl-containing preceramic silazane polymer infusible, wherein the vinyl- or allyl-containing preceramic silazane polymer contains an average of at least 0.7 vinyl or allyl groups per weight average molecule.

This invention also relates to a method of rendering a vinyl- or allyl-containing preceramic silazane polymer infusible prior to pyrolysis, which method comprises treating the vinyl- or allyl-containing preceramic silazane polymer with high energy radiation for a time sufficient to render the vinyl- or allyl-containing preceramic silazane polymer infusible wherein the vinyl- or allyl-containing preceramic silazane polymer contains an average of at least 0.7 vinyl or allyl groups per weight average molecule.

This invention also relates to a method of rendering a preceramic polymer composition infusible prior to pyrolysis, which method comprises treating the preceramic polymer composition with high energy radiation for a time sufficient to render the preceramic polymer composition infusible wherein the preceramic polymer composition contains a vinyl- or allyl-containing preceramic silazane polymer with an average of at least 0.7 vinyl or allyl groups per weight average molecule and a mercapto compound with at least two mercapto groups per molecule.

Treatment of the preceramic silazane polymer compositions of the present invention with high energy radiation will result in an infusible preceramic silazane polymer material suitable for pyrolysis to form a ceramic material. Preceramic silazane polymer compositions in the form of pellets, powders, flakes, foams, fibers, and the like are especially suitable for treatment with high energy radiation such as gamma rays or electron beam by the method of this invention. Preceramic silazane polymer compositions in the form of fibers are especially preferred in the practice of this invention.

The high energy radiation suitable for use in this invention includes gamma rays, alpha rays, beta rays (electron beams), and neutron beams. Generally, gamma rays and beta rays are the preferred high energy radiation source with beta rays or electron beam being most preferred. Any suitable source of the high energy radiation may be used. For example, gamma rays may be obtained from a cobalt-60, cesium-137, or radium-226 source; alpha rays may be obtained from a polonium-210 or radium-226 source; beta rays from a krypton-85 or strontium-90 and yttrium-90 source; and neutrons from a source consisting of the pairs radium-226 and beryllium, polonium-210 and beryllium, and antimony-124 and beryllium. Other conventional sources may be used. Care must be taken in handling these radioisotopes. The appropriate safety and health standards should be consulted. Normally, radiation energies of a thousand to a few million electron volts can be used.

The temperature of treatment of the vinyl- or allyl-containing preceramic silazane polymers with the high energy radiation source should be sufficiently low so that the preceramic silazane polymer composition does not melt or fuse during the irradiation step. Preferably the treatment temperature is between room temperature and the softening temperature of the preceramic silazane polymer. More preferably the treatment temperature should be between room temperature and about 10° C. below the softening temperature of the preceramic silazane polymer.

The preceramic silazane polymers are treated by the high energy radiation source for a time sufficient to render the preceramic silazane polymer infusible. What is meant by "infusible" in this specification is that the irradiated preceramic silazane polymer, when heated rapidly up to the pyrolysis temperature, will not fuse together. A crude screening test for infusibility is provided by the solubility of the preceramic silazane polymer in toluene. Prior to irradiation the preceramic silazane polymers of this invention are almost completely soluble in toluene. The infusible preceramic silazane polymer compositions obtained by the method of this invention are generally either insoluble in toluene or have only limited solubility in toluene. The time required to render the preceramic silazane polymer composition infusible by the method of this invention will depend, in part, on the size of the preceramic silazane polymer article, the temperature of the high energy radiation treatment, the radiation energy and dosage of the high energy radiation, the irradiation atmosphere, and the specific vinyl- or allyl-containing preceramic silazane employed. The optimum treatment time can be determined by routine experimentation.

The amount or dosage of high energy radiation that the preceramic silazane polymer should be exposed to, is the amount sufficient to render the preceramic silazane polymer infusible. This required amount will vary from case to case depending, in part, upon the temperature, duration of exposure, the exact energy level of the high energy radiation source, the number of vinyl or allyl groups in the preceramic silazane polymer, and the actual preceramic silazane polymer used as well as other variables. The duration and intensity of the high energy radiation are obviously closely related variables.

When the preceramic silazane polymer is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the uncured interior to leak out.

The preceramic silazane polymer may be exposed to high energy radiation in a vacuum or under an inert atmosphere. In the case of preceramic silazane polymer fibers, the irradiation may be carried out using a continuous, "on-line" method as the fibers are formed. Other methods of irradiation may be employed.

The vinyl- or allyl-containing preceramic silazane polymers suitable for use in this invention must contain an average of at least 0.7 vinyl or allyl groups per weight average molecule. The preceramic silazane polymers may contain mixtures of vinyl and allyl groups such that the total average number of vinyl and allyl groups is at least 0.7 per weight average molecule. Generally, however, the vinyl-containing preceramic silazane polymers are preferred. The vinyl- or allyl-containing preceramic silazane polymers suitable for this invention must be capable, after being cured by exposure to high energy radiation, of being converted to a ceramic material by pyrolysis at elevated temperatures. It is generally preferred that the preceramic silazane polymer compositions used in this invention be capable of being converted to ceramic materials in at least 40 weight percent yield. Mixtures of preceramic silazane polymers may also be used in this invention.

Examples of preceramic silazane polymers or polysilazanes suitable for use in this invention include vinyl- or allylcontaining polysilazanes as prepared by the method of Gaul in U.S. Pat. Nos. 4,312,970 (issued Jan. 26, 1982), 4,340,619 (issued July 20, 1982), 4,395,460 (issued July 26, 1983), and 4,404,153 (issued Sept. 13, 1983), all of which are hereby incorporated by reference. Suitable vinyl- or allyl-containing polysilazanes also include those prepared by the method of Haluska in U.S. Pat. No. 4,482,689 (issued Nov. 13, 1984) and Seyferth et al. in U.S. Pat. No. 4,397,828 (issued Aug. 9, 1983), both of which are hereby incorporated by reference. Other vinyl- or allyl-containing polysilazanes suitable for use in this invention can be prepared by the method of Cannady in U.S. Pat. Nos. 4,540,803 (issued Sept. 10, 1985) and 4,543,344 (issued Sept. 24, 1985) which are hereby incorporated by reference. Still other vinyl- or allyl-containing polysilazanes may be suitable for use in this invention.

Vinyl-containing or allyl-containing preceramic silazane polymers especially useful in this invention can be, for example, prepared by the methods described in U.S. Pat. Nos. 4,312,970, 4,340,619, and 4,540,803.

The vinyl- or allyl-containing preceramic silazane polymers prepared by the method in U.S. Pat. No. 4,312,970 are obtained by contacting and reacting in an inert, essentially anhydrous, atmosphere, an organochlorosilane or a mixture of organochlorosilanes of the general formula $R'_c SiCl_{(4-c)}$ with a disilazane having the general formula $(R_3Si)_2NH$ at a temperature in the range of 25° C. to 300° C. while distilling by-produced volatile products, wherein R' is selected from the group consisting of vinyl, allyl, phenyl, and alkyl radicals containing 1 to 4 carbon atoms; R is selected from the group consisting of vinyl, allyl, hydrogen, phenyl, and alkyl radicals containing 1 to 4 carbon atoms; and c has a value of 1 or 2. The R and R' groups must be selected such that the resulting preceramic polymer has the required average number of vinyl and/or allyl groups.

The organochloromonosilanes of U.S. Pat. No. 4,312,970 are those having the general formula $R'_c SiCl_{(4-c)}$ where R' is vinyl, allyl, alkyl radical containing 1 to 4 carbon atoms, or the phenyl group. Thus, those groups which are contemplated as being useful in this invention are methyl, ethyl, propyl, butyl, vinyl, allyl, and phenyl. The R' groups can all be the same or they can be different. The organochloromonosilanes are common commodity chemicals and are commercially available and, therefore, an explanation as to their preparation does not appear to be necessary. The value of c is 1 or 2. Thus, single organic group substituted silanes such as $CH_3SiCl_3$, $C_6H_5SiCl_3$, $CH_2=CHSiCl_3$, $(CH_2=CHCH_2)SiCl_3$ or $CH_3(CH_2)_{substituted\ silanes\ such\ as}$ $(CH_3)_2SiCl_2$, $(C_2H_5)_2SiCl_2(CH_2=CH)(CH_3)SiCl_2$, and $(CH_2=CHCH_2)(CH_3)SiCl_2$, such silanes, for example $CH_3SiCl_3$ and $(CH_3)_2SiCl_2$, can be used. It is preferred that when organochlorosilane mixtures are used, the number of units of diorgano-substituted silicon atoms should not exceed the number of units of monoorganosubstituted silicon atoms.

The vinyl- or allyl-containing preceramic silazane polymers prepared by the method of U.S. Pat. No. 4,340,619 are obtained by contacting and reacting in an inert, essentially anhydrous, atmosphere, a chlorine-containing disilane or a mixture of chlorine-containing disilanes, of the general formula $(Cl_d R'_e Si)_2$ with a disilazane having the general formula $(R_3Si)_2NH$ at a temperature in the range of 25° C. to 300° C. while distilling by-produced volatile products, wherein R' is selected from the group consisting of vinyl, allyl, phenyl, and alkyl radicals containing 1 to 4 carbon atoms; R is selected from the group consisting of vinyl, allyl, hydrogen, phenyl, and alkyl radicals containing 1 to 4 carbon atoms; d has a value of 0.5–3; e has a value of 0–2.5 and the sum of (d+e) is equal to three. The R and R' groups must be selected such that the resulting preceramic polymer has the required average number of vinyl and/or allyl groups.

The chlorine-containing disilanes of U.S. Pat. No. 4,340,619 are those disilanes having the general formula $(Cl_d R'_e Si)_2$ where R' is vinyl, allyl, an alkyl radical containing 1 to 4 carbon atoms or the phenyl group. Thus, the R' groups are methyl, ethyl, propyl, butyl, vinyl, allyl, and phenyl. The R' groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes. For the chlorine-containing disilanes described above, the value of d and e is from 0.5-3 and 0-2.5 respectively, and the sum of (d+3) is equal to three. Examples of chlorine-containing disilanes are $(Cl_2(CH_3)Si)_2$, $(Cl(CH_3)_2Si)_2$, $(Cl_2(C_{Cl(C_6H_5)_2}Si)_2$ and $(Cl_2(CH_2=CH)Si)_2$. Monosilanes used in admixtures with the above described chlorine-containing disilanes. Examples include $CH_3SiCl_3$, $(CH_3)_2SiCl_2$, $H(CH_3)_2 (CH_3)_3SiCl$, $(CH_2=CH)(CH_3)_2SiCl$, $(CH_2=CH)(C_6H_{(CH_2=CHCH_2)}(CH_3)SiCl_2$, $(C_2H_5)_2SiCl_2$, $(CH_2=CHCH_2)SiCl_3$, $(C_6H_5)_2SiCl_2$, $(C_6H$ Incorporation of an appropriate monosilane may be used to obtain the required vinyl or allyl groups in the preceramic silazane polymer. When polysilazane polymers are prepared by the method of U.S. Pat. No. 4,340,619 for use in this invention it is preferred that mixtures of chlorine-containing disilanes be employed where the number of units of diorgano-substituted silicon atoms does not exceed the number of units of monoorganosubstituted silicon atoms.

The vinyl- or allyl-containing preceramic silazane polymers prepared by the method of U.S. Pat. No. 4,540,803 are obtained by contacting and reacting in an inert, essentially anhydrous atmosphere, trichlorisilane with a disilazane at a temperature in the range of 25° C. to 300° C. while removing byproduced volatile products, wherein said disilazane has the general formula $(R_3Si)_2NH$ where R is selected from the group consisting of vinyl, allyl, hydrogen, phenyl, and alkyl radicals containing 1 to 4 carbon atoms. The R groups must be selected such that the resulting preceramic polymer has the required average number of vinyl and/or allyl groups. It appears that some component, possibly a hydrolysis product, in aged trichlorosilane is detrimental in the preparation of this preceramic silazane polymer. Such contaminated trichlorosilanes can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combinations of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in U.S. Pat. Nos. 4,312,970, 4,340,619, and 4,540,803 is a disilazane of the general formula $(R_3Si)_2NH$. R in this formula is vinyl, allyl, hydrogen, an alkyl radical of 1 to 4 carbon atoms or the phenyl group. Therefore, R, for purposes of this formula, is represented by hydrogen, methyl, ethyl, propyl, butyl, vinyl, allyl, and phenyl. Each R group in this formula can be the same or they can be different. Examples of the disilazanes include $((CH_3)_3Si)_2NH$, $(C_6H_5(CH_3)_2Si)_2NH$, $((C_{(CH_2=CH(CH_3)_2}Si)_2NH$, $(CH_2=CH(CH_3)C_3)C_6(CH_2=CH(C_2H_5)_2Si)_2NH$, $(H(CH_3)_2Si)_2NH$ $(CH_2=CHCH_2(CH_3)_2Si)_2NH$, $(CH_2=CHCH_2(CH_3(CH_2=CHCH_2(C_6H_5)_2Si)_2NH$, $(CH_2=CHCH_2$ The reactants in U.S. Pat. Nos. 4,312,970, 4,340,619, and 4,540,803 are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970, 4,340,619, and 4,540,803 the reaction begins which forms an intermediate amino compound. Upon heating, additional amino compound is formed and upon continued heating, $R_3SiCl$ is distilled from the reaction mixture and a silazane polymer is formed. The order of addition of the materials does not appear to be critical. As the temperature is raised higher, more condensation takes place and branching occurs with residual $R_3Si-$ that is not distilled from the mixture acting as a chain stopper. This control allows one to stop the reaction at any point to obtain almost any desired viscosity. The desirable temperature range for this reaction is 25 to 300° C. A preferred temperature range for this reaction is 125 to 300° C. The length of time that the reaction requires depends on the temperature employed and the viscosity one wishes to achieve. What is meant by "volatile products" are the distillable by-produced products that are formed by the reactions set forth above. These materials can be represented by $(CH_3)_3SiCl$, $(CH_2=CH)(C_6H_5)_2SiCl$, $CH_3(C_6$ and $(CH_2=CH)(CH_3)_2SiCl$. Sometimes, the process requires the use of a vacuum along with the heat in order to remove these materials from the reaction mixture.

One especially preferred preceramic silazane polymer may be prepared by the general method described in U.S. Pat. No. 4,340,619 by reacting chlorine-containing disilanes from a Direct Process residue and a vinyl- or allyl-containing, chlorine-containing monosilane with hexamethyldisilazane. An especially preferred chlorine-containing monosilane is phenylvinyldichlorosilane. The monosilane may be used to introduce unsaturation into the preceramic silazane polymer. Other vinyl- or allyl-containing monosilanes may be used.

The vinyl or allyl groups may also be introduced into the silazane polymers by replacement of residual chlorine or bromine in the silazane polymer with vinyl or allyl groups by reaction with the appropriate vinyl- or allyl-containing Grignard reagents or organolithium compounds as generally described in Baney et al. in U.S. Pat. No. 4,298,559 (issued Nov. 3, 1981) which is hereby incorporated by reference.

The vinyl- or allyl-containing preceramic silazane polymer may have other functional groups attached to silicon which may allow for more efficient cure by providing additional crosslinking sites or crosslinking mechanisms. For example, incorporating SiH groups or aliphatic mercapto groups into the vinyl- or allyl-containing preceramic silazane polymer may be useful. The aliphatic mercapto groups are attached to silicon by a carbon-silicon bond. Addition of such units may allow for faster cure rates or for cure at lower radiation levels.

Mercapto compounds may also be added to the vinyl- or allyl-containing preceramic silazane polymers of this invention prior to the high energy radiation treatment. Incorporation of mercapto compounds generally allows for either faster cure or cure at reduced levels of high energy radiation relative to compositions without the mercapto compounds. The mercapto compounds useful in this invention should contain at least two SH groups per molecule. Mercapto compounds containing at least three SH groups are preferred. The mercapto compounds may be either organic or siloxanes. Mixtures of the mercapto compounds can also be used. Examples of suitable mercapto compounds include dipentaerythritol hexa(3-mercaptopropionate), pentaerythritol tetra(3-mercaptopropionate), pentaerythritol tetrathioglycolate, polyethylene glycol di(3-mercaptopropionate) of the formula $HSCH_2CH_2COOCH_2(CH_2OCH_2)_{11}C-H_2OOCCH_2$tri(3-mercaptopropionate), trimethylolethane trithioglycolate, trimethylolpropane trithioglycolate, trimethylolpropane tri(3-mercaptopropionate), $(CH_3)_3SiO(CH_3(HSCH_2H(CH_3)CH_2)SiO)_5Si(C-H_3$Other mercapto compounds containing at least two SH groups, and preferably at least three SH groups, may be used. Vinyl- or allyl-containing preceramic silazane polymers which also contain mercapto groups may also be used in this invention. Vinyl- or allyl-containing preceramic silazane polymers which also contain both mercapto groups and hydrogen attached to silicon may also be used in this invention.

After the preceramic silazane polymer composition has been rendered infusible by treatment with high energy radiation, the infusible preceramic silazane polymer composition is fired to an elevated temperature of at least 750° C. in an inert atmosphere, vacuum, or ammonia-containing atmosphere until the mixture is converted to a ceramic material. Preferably the pyrolysis temperature is from about 1000° C. to about 1600° C. Since the preceramic silazane polymer compositions of this invention have been rendered infusible prior to pyrolysis, the pyrolysis step may be carried out by quickly raising the temperature to the desired level. If the preceramic silazane polymer composition is of sufficient viscosity or if it possesses a sufficiently low melt temperature, it can be shaped first, then rendered infusible, and then finally pyrolyzed to give a ceramic shaped article such as a fiber. Preferably the preceramic silazane polymers used in the practice of this invention have a softening temperature of about 50° C. to 300° C. and most preferably in the range of 70° C. to 200° C. Such a softening temperature allows for the formation of preceramic fibers by known spinning techniques.

So that those skilled in the art can better appreciate and understand the invention, the following examples are given. Unless otherwise indicated, all percentages are by weight.

EXAMPLE 1

A vinyl-containing silazane polymer was prepared using the general procedure of U.S. Pat. No. 4,340,619. Chlorodisilanes (206 g, 1.0 mole), 24.3 g (0.17 moles) methylvinyldichlorosilane, and 24.3 g (0.21 moles) hydrogenmethyldichlorosilane were reacted with 445 g (2.8 moles) hexamethyldisilazane under argon. The chlorodisilanes employed were a Direct Process residue which was vacuum distilled. The chlorodisilanes contained about 52.7 weight percent $CH_3Cl_2SiSiCl_2CH_3$, 39.9 weight percent $CH_3Cl_2SiSiCl(CH_3)_2$, and 7.4 weight percent $(CH_3)_2ClSiSiCl(CH_3)_2$. The reaction mixture was heated from room temperature to 80° C. at a rate of 2.5° C./min, held at 80° C. for 20 minutes, 80° C. to 220° C. at 1.0° C./min, and held at 220° C. for 10 minutes while removing volatile by-products by distillation. The preceramic polymer was stored in a nitrogen filled glove bag until used. The vinyl-containing silazane polymer contained an estimated 5 mole percent $(CH_3(CH_2=CH)Si)$ units and 5 mole percent $(H(CH_3)Si)$ units and had a softening temperature of 50° C. Fibers were prepared in a melt rheometer at a spinning temperature of 95° C. The fibers had an average diameter of about 40 microns.

Several samples of fibers were exposed to varying levels of gamma radiation using a cobalt-60 source with a radiation output of 0.05 megarads/hr. The fibers were kept under an argon purge throughout the irradiation period. The cure effectiveness was estimated indirectly by toluene solubility. Fibers which were soluble in toluene after the irradiation generally could not survive pyrolysis to elevated temperatures (>300° C); at elevated temperatures such fibers would normally melt and fuse together. Fibers which were moderately insoluble or very insoluble would generally survive the pyrolysis intact as individual fibers. The cure effectiveness was also evaluated directly by pyrolysis to 1200° C. at a rate of about 10-12° C./min under argon. Preceramic polymers which can withstand this type of pyrolysis without melting are considered infusible. The following results were obtained.

| Dosage (megarad) | Toluene Solubility | Pyrolysis (1200° C.) |
| --- | --- | --- |
| 0 | soluble | melted |
| 4 | moderately soluble | intact |
| 8 | insoluble | intact |
| 20 | insoluble | intact |

"Intact" means that the fibers survived the pyrolysis as individual, discrete fibers which had not melted or fused together. Therefore fibers cured with at least 4 megarads of gamma radiation are sufficiently cured to withstand rapid pyrolysis to 1200° C. without melting and fusing.

EXAMPLE 2

Fibers as prepared in Example 1 were exposed to varying levels of electron beam radiation. The electron beam instrument used was an Energy Sciences CB 150/15/10L Electrocurtain System. The beam voltage was 170kv. The dosage was varied by adjustment of the exposure time. Fiber samples were placed in a 15 × 15 cm aluminum pan and moved under the electron beam by a conveyor belt. The beam chamber was purged with nitrogen to maintain an oxygen level in the chamber below about one half percent. The following results were obtained.

| Dosage (megarad) | Toluene Solubility | Pyrolysis Temp.(C.) | Result |
| --- | --- | --- | --- |
| 0 | soluble | 1200 | melted |
| 5* | soluble | 1200 | intact |
| 10 | insoluble | 300 | intact |
| 10* | soluble | 600 | intact |
| 20 | insoluble | 1200 | intact |
| 20* | moderately insoluble | 600 | intact |

Fiber samples labeled "*" in the above table were from a second batch of fibers which were prepared from the same polymer as the other samples. This second batch of fibers was prepared about two weeks after the other fibers. The reasons for the differences in toluene solubility are not clear. However, fibers cured with at least 5 megarads electron beam radiation were rendered infusible since they survived pyrolysis to elevated temperatures without melting or fusing together.

EXAMPLE 3

Fibers prepared from the same polymer in Example 1 were cured with 20 megarads of electrons as in Example 2 except that the radiation zone was maintained at about 1000 parts per million oxygen. The irradiated fibers were moderately insoluble in toluene. The irradiated fibers heated to either 300° C. or 1200° C. did not melt.

EXAMPLE 4

A vinyl-containing silazane polymer was prepared using the general procedure of Example 1. Chlorodisilanes (205.9 g, 1.0 mole) and 32.3 g (0.20 moles) vinyltrichlorosilane were reacted with 467 g (2.9 moles) hexamethyldisilazane under argon. The chlorodisilanes employed were a Direct Process residue which was vacuum distilled. The chlorodisilanes contained about 52.5 weight percent $CH_3Cl_2SiSiCl_2CH_3$, 40.6 weight percent $CH_3Cl_2SiSiCl(CH_3)_2$, and 6.9 weight percent $(CH_3)_2ClSiSiCl(CH_3)_2$. The reaction mixture was heated from room temperature at 80° C. at a rate of 2.5° C./min, held at 80° C. for 20 minutes, 80° C. to 220° C. at 1.0° C./min, and held at 220° C. for 10 minutes while removing volatile by-products by distillation. The vinyl-containing silazane polymer contained an estimated 5 mole percent $((CH_2=CH)Si)$ units. Fibers with an average diameter of about 40 microns were prepared as in Example 1.

Several samples of fibers were exposed to varying levels of gamma radiation and then evaluated as to cure effectiveness as in Example 1. The following results were obtained.

| Dosage (megarad) | Toluene Solubility | Pyrolysis (1200° C.) |
| --- | --- | --- |
| 0 | soluble | melted |
| 8 | moderately insoluble | intact |
| 20 | insoluble | intact |

Therefore fibers cured with at least 8 megarads of gamma radiation are sufficiently cured to withstand rapid pyrolysis to 1200° C. without melting and fusing.

EXAMPLE 5

Fibers as prepared in Example 4 were exposed to varying levels of electron beam radiation using the procedure of Example 2. The following results were obtained.

| Dosage | Toluene | Pyrolysis | |
|---|---|---|---|
| (megarad) | Solubility | Temp.(C.) | Result |
| 0 | soluble | 1200 | melted |
| 10 | soluble | 1200 | intact |
| 20 | slightly insoluble | 600 | intact |

Based on the results upon pyrolysis, the fibers had been rendered infusible upon exposure to at least 10 megarads electron beam radiation.

EXAMPLE 6

Another vinyl-containing silazane polymer was prepared using the general procedure of Example 1. Chlorodisilanes (205.9 g, 1.0 mole) and 28.2 g (0.20 moles) methylvinyldichlorosilane were reacted with 443 g (2.8 moles) hexamethyldisilazane under argon. The chlorodisilanes employed and procedures were the same as in Example 4. This vinyl-containing polymer was blended in hexane with polymethylisobutylmercaptosiloxane to obtain a 2.5 SH/(CH$_2$=CH) molar ratio. The blend was a viscous, gum-like fluid after the solvent was removed under vacuum. This fluid was exposed to 4 megarads of gamma radiation and was converted into a very stiff, rubber-like material which was insoluble in xylene. This cured material did not melt when heated to 230° C. indicating that it had been rendered infusible by the gamma irradiation.

EXAMPLE 7

The vinyl-containing silazane polymer and polymethylisobutylmercaptosiloxane blend of Example 6 was used in this example. Films of the blend were prepared on several 2 by 2 inch pieces of aluminum foil. The hexane solvent was removed by a three hour argon purge in a desiccator. Individual samples were then exposed to 0.5, 1.0, 2.0, 3.0, and 5.0 megarads of electron beam radiation. The 0.5 megarads sample remained sticky. All other samples exposed to the electron beam gave a non-tacky surface indicating that they had been rendered infusible by exposure to the electron beam.

EXAMPLE 8

A blend 90 weight percent of the vinyl-containing silazane polymer of Example 6 and 10 weight percent of dimercaptodiethyl ether in toluene (about 40 weight percent solids) was prepared. Half of this solution was kept at room temperature and the other half at 50° C. for 8 hours. After the 8 hour period films on aluminum foil were prepared and dried as in Example 7. Both samples were irradiated with 1.0 megarad in the electron beam. Both samples were converted from a sticky, viscous gum to a solid, resinous material indicated that the electron beam had cured the blends.

EXAMPLE 9

This example, which demonstrates gamma and electron beam irradiation of a preceramic polymer which does not contain vinyl or allyl groups, is included for comparison purposes only. The preceramic polymer was prepared using the procedure of U.S. Pat. No. 4,340,619 by reacting chlorodisilanes from a Direct Process residue with hexamethyldisilazane using the same procedures as Example 1. Fibers with an average diameter of 25 microns were prepared by spinning at 150° C. Separate fiber samples were exposed to 20 megarads of gamma radiation and 20 megarads of electron beam radiation. Both irradiated samples were completely soluble in toluene. The gamma ray treated sample was fired to 1200° C. and formed a fused, brittle mass. The electron beam treated sample fused together when it was fired to 600° C.

That which is claimed is:

1. A method of rendering vinyl- or allyl-containing preceramic silazane polymers infusible prior to pyrolysis, which method comprises treating a material consisting essentially of a vinyl- or allyl-containing preceramic silazane polymer with high energy radiation for a time sufficient to render the vinyl- or allyl-containing preceramic silazane polymer infusible, wherein the vinyl- or allyl-containing preceramic silazane polymer contains an average of at least 0.7 vinyl or allyl groups per weight average molecule.

2. A method as claimed in claim 1 wherein the high energy irradiation is a gamma ray.

3. A method as claimed in claim 1 wherein the high energy irradiation is an electron beam.

4. A method as claimed in claim 1 wherein the vinyl- or allyl-containing preceramic silazane polymer is in the form of a fiber.

5. A method as claimed in claim 2 wherein the vinyl- or allyl-containing preceramic silazane polymer is in the form of a fiber.

6. A method as claimed in claim 3 wherein the vinyl- or allyl-containing preceramic silazane polymer is in the form of a fiber.

7. A method as claimed in claim 2 wherein the preceramic silazane polymer contains vinyl groups in the form of ((CH$_2$=CH)Si) units.

8. A method as claimed in claim 3 wherein the preceramic silazane polymer contains vinyl groups in the form of ((CH$_2$=CH)Si) units.

9. A method as claimed in claim 2 wherein the preceramic silazane polymer contains vinyl groups in the form of (CH$_3$(CH$_2$=CH)Si) units.

10. A method as claimed in claim 3 wherein the preceramic silazane polymer contains vinyl groups in the form of (CH$_3$(CH$_2$=CH)Si) units.

11. A method of rendering preceramic polymer compositions infusible prior to pyrolysis, which method comprises treating a preceramic polymer composition with high energy radiation for a time sufficient to render the preceramic polymer composition infusible wherein the preceramic polymer composition contains a vinyl- or allyl-containing preceramic silazane polymer with an average of at least 0.7 vinyl or allyl groups per weight average molecule and a mercapto compound with at least two mercapto groups per molecule.

12. A method as claimed in claim 11 wherein the high energy irradiation is a gamma ray.

13. A method as claimed in claim 11 wherein the high energy irradiation is an electron beam.

14. A method as claimed in claim 11 wherein the preceramic silazane polymer composition is in the form of a fiber.

15. A method as claimed in claim 12 wherein the preceramic silazane polymer composition is in the form of a fiber.

16. A method as claimed in claim 13 wherein the preceramic silazane polymer composition is in the form of a fiber.

17. A method as claimed in claim 12 wherein the mercapto compound contains at least three mercapto groups.

18. A method as claimed in claim 13 wherein the mercapto compound contains at least three mercapto groups.

19. A method as claimed in claim 12 wherein the preceramic silazane polymer contains vinyl groups in the form of ((CH$_2$=CH)Si) units.

20. A method as claimed in claim 13 wherein the preceramic silazane polymer contains vinyl groups in the form of ((CH$_2$=CH)Si) units.

21. A method as claimed in claim 12 wherein the preceramic silazane polymer contains vinyl groups in the form of (CH$_3$(CH$_2$=CH)Si) units.

22. A method as claimed in claim 13 wherein the preceramic silazane polymer contains vinyl groups in the form of (CH$_3$(CH$_2$=CH)Si) units.

23. A method of preparing a shaped ceramic material, said method comprising pyrolyzing a shaped infusible preceramic silazane polymer in an inert atmosphere or in a vacuum to a temperature of at least 750° C. until said shaped infusible silazane polymer is converted to a ceramic material, the improvement comprising obtaining the shaped infusible preceramic silazane polymer by a method of rendering a vinyl- or allyl-containing preceramic silazane polymer infusible prior to the pyrolysis by a method which comprises treating a material consisting essentially of a vinyl- or allyl-containing preceramic silazane polymer with high energy radiation for a time sufficient to render the vinyl- or allyl-containing preceramic silazane polymer infusible, wherein the vinyl- or allyl-containing preceramic silazane polymer contains an average of at least 0.7 vinyl or allyl groups per weight average molecule.

24. A method as claimed in claim 23 wherein the high energy irradiation is a gamma ray.

25. A method as claimed in claim 23 wherein the high energy irradiation is an electron beam.

26. A method as claimed in claim 23 where the vinyl- or allyl-containing preceramic silazane polymer is in the form of a fiber.

27. A method as claimed in claim 24 wherein the vinyl- or allyl-containing preceramic silazane polymer is in the form of a fiber.

28. A method as claimed in claim 25 wherein the vinyl- or allyl-containing preceramic silazane polymer is in the form of a fiber.

29. A method as claimed in claim 24 wherein the preceramic silazane polymer contains vinyl groups in the form of ((CH2=CH)Si) units.

30. A method as claimed in claim 25 wherein the preceramic silazane polymer contains vinyl groups in the form of ((CH2=CH)Si) units.

31. A method as claimed in claim 24 wherein the preceramic silazane polymer contains vinyl groups in the form of (CH3(CH2=CH)Si) units.

32. A method as claimed in claim 25 wherein the preceramic silazane polymer contains vinyl groups in the form of (CH3(CH2=CH)Si) units.

33. A method of preparing a shaped ceramic material, said method comprising pyrolyzing a shaped infusible preceramic silazane polymer composition in an inert atmosphere or in a vacuum to a temperature of at least 750° C. until said shaped infusible silazane polymer composition is converted to a ceramic material, the improvement comprising obtaining the shaped infusible preceramic silazane polymer composition by a method of rendering a vinyl- or allyl-containing preceramic silazane polymer composition infusible prior to the pyrolysis by a method which comprises treating a preceramic silazane polymer composition with high energy radiation for a time sufficient to render the preceramic silazane polymer composition infusible wherein the preceramic silazane polymer composition contains a vinyl- or allyl-containing preceramic silazane polymer with an average of at least 0.7 vinyl or allyl groups per weight average molecule and a mercapto compound with at least two mercapto groups per molecule.

34. A method as claimed in claim 33 wherein the high energy irradiation is a gamma ray.

35. A method as claimed in claim 33 wherein the high energy irradiation is an electron beam.

36. A method as claimed in claim 33 wherein the preceramic silazane polymer composition is in the form of a fiber.

37. A method as claimed in claim 34 wherein the preceramic silazane polymer composition is in the form of a fiber.

38. A method as claimed in claim 35 wherein the preceramic silazane polymer composition is in the form of a fiber.

39. A method as claimed in claim 34 wherein the mercapto compound contains at least three mercapto groups.

40. A method as claimed in claim 35 wherein the mercapto compound contains at least three mercapto groups.

41. A method as claimed in claim 34 wherein the preceramic silazane polymer contains vinyl groups in the form of ((CH2=CH)Si) units.

42. A method as claimed in claim 35 wherein the preceramic silazane polymer contains vinyl groups in the form of ((CH2=CH)Si) units.

43. A method as claimed in claim 34 wherein the preceramic silazane polymer contains vinyl groups in the form of (CH3(CH2=CH)Si) units.

44. A method as claimed in claim 35 wherein the preceramic silazane polymer contains vinyl groups in the form of (CH3(CH2=CH)Si) units.

* * * * *